US011222009B2

(12) United States Patent
Shi et al.

(10) Patent No.: US 11,222,009 B2
(45) Date of Patent: Jan. 11, 2022

(54) HIGH THROUGHPUT BLOCKCHAIN CONSENSUS SYSTEMS AND METHODS WITH LOW FINALIZATION TIME

(71) Applicant: Thunder Token Inc., Sunnyvale, CA (US)

(72) Inventors: Runting Shi, Sunnyvale, CA (US); Rafael Nat Josef Pass, Sunnyvale, CA (US); Tsz Hong Hubert Chan, Sunnyvale, CA (US); Chang-Zen Tsai, Taipei (TW); Chia-Hao Lo, New Taipei (TW)

(73) Assignee: Thunder Token Inc., Sunnyvale, CA (US)

( * ) Notice: Subject to any disclaimer, the term of this patent is extended or adjusted under 35 U.S.C. 154(b) by 95 days.

(21) Appl. No.: 16/586,508

(22) Filed: Sep. 27, 2019

(65) Prior Publication Data

US 2020/0104293 A1 Apr. 2, 2020

Related U.S. Application Data

(60) Provisional application No. 62/738,791, filed on Sep. 28, 2018.

(51) Int. Cl.
*G06F 16/23* (2019.01)
*H04L 9/00* (2006.01)

(52) U.S. Cl.
CPC ...... *G06F 16/2365* (2019.01); *G06F 16/2379* (2019.01); *H04L 9/00* (2013.01)

(58) Field of Classification Search
CPC ........ H04L 41/30; H04L 2209/38; H04L 9/00
See application file for complete search history.

(56) References Cited

U.S. PATENT DOCUMENTS

2016/0335533 A1 11/2016 Davis et al.
2017/0236120 A1* 8/2017 Herlihy ................. G06F 21/57
705/67

(Continued)

OTHER PUBLICATIONS

Jae Kwon, "Tendermint: Consensus without Mining," 2014, https://tendermint.com/static/docs/tendermint.pdf, all pages. (Year: 2014).*

(Continued)

*Primary Examiner* — Grace Park
(74) *Attorney, Agent, or Firm* — Fox Rothschild LLP

(57) ABSTRACT

The present invention is directed blockchain systems and censuses protocols that adopt a pipelining technique. The systems and protocols involve a committee of consensus nodes that include proposer nodes and voter nodes. Each proposer node can send two or more unnotarized proposals to the voter nodes, and the voter nodes can vote on an unnotarized proposal when they have the same freshest notarized chain or block. A sequence number is provided to facilitate the operation of the systems and protocols. The sequence number can be used to determine the freshest notarized chain or block and the finalized chain and switch proposer node. The systems and protocols also provide other features such as chain syncer, committee election scheme, and committee reconfiguration. The systems and protocols further provide a simple finalization process and thus have a low finalization time.

20 Claims, 10 Drawing Sheets

(56) References Cited

U.S. PATENT DOCUMENTS

2018/0101560 A1 4/2018 Christidis et al.
2018/0374173 A1* 12/2018 Chen .................... H04L 9/3236

OTHER PUBLICATIONS

Zheng et al., "An Overview of Blockchain Technology: Architecture, Consensus, and Future Trends," Jun. 2017, IEEE, 557-564. (Year: 2017).*
International Search Report and Written Opinion, PCT/US19/53608 dated Dec. 31, 2019.

* cited by examiner

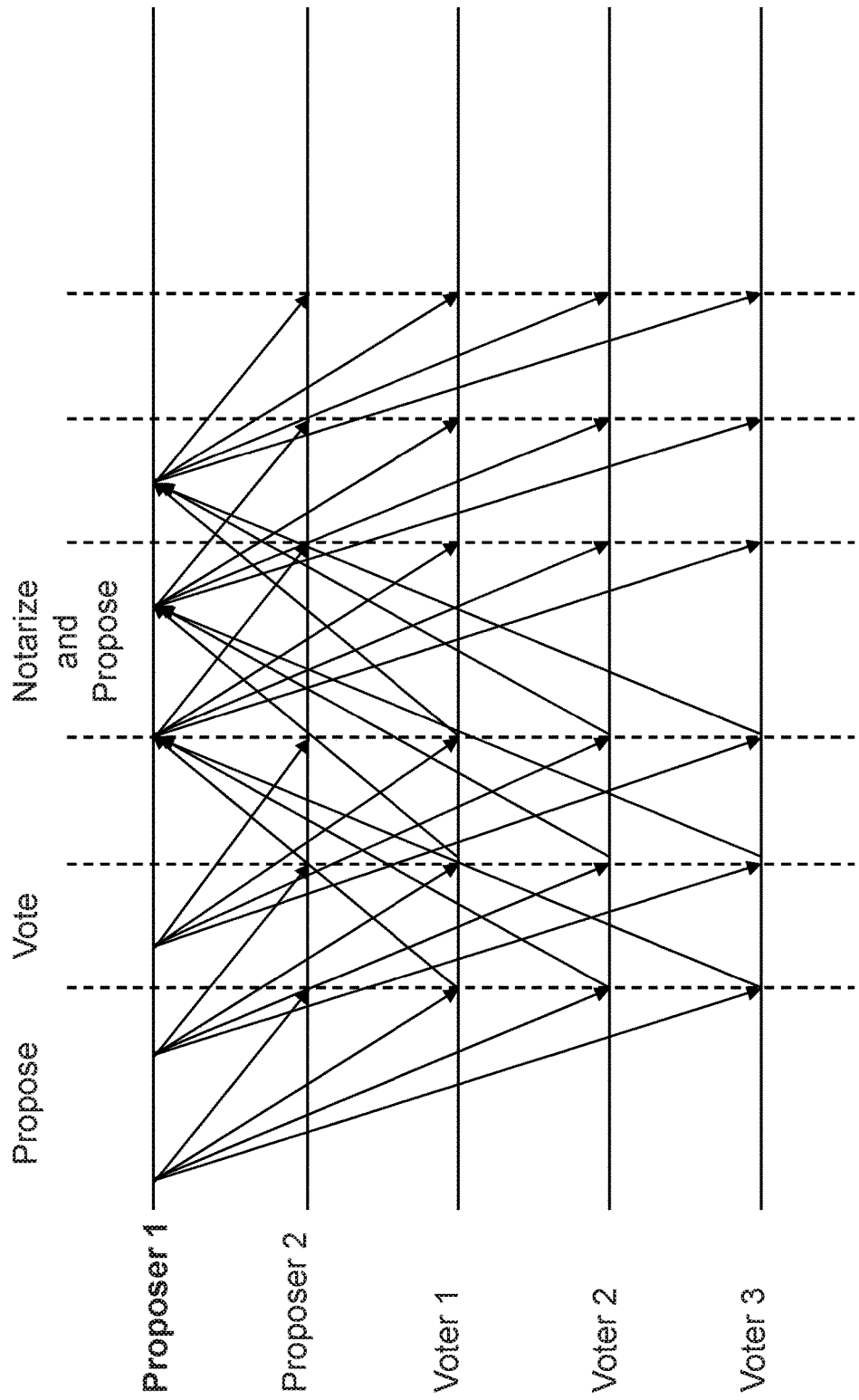

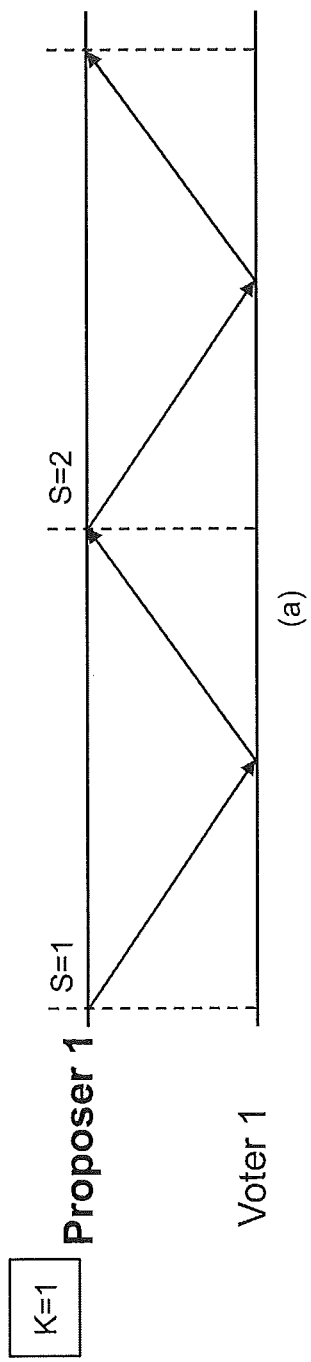
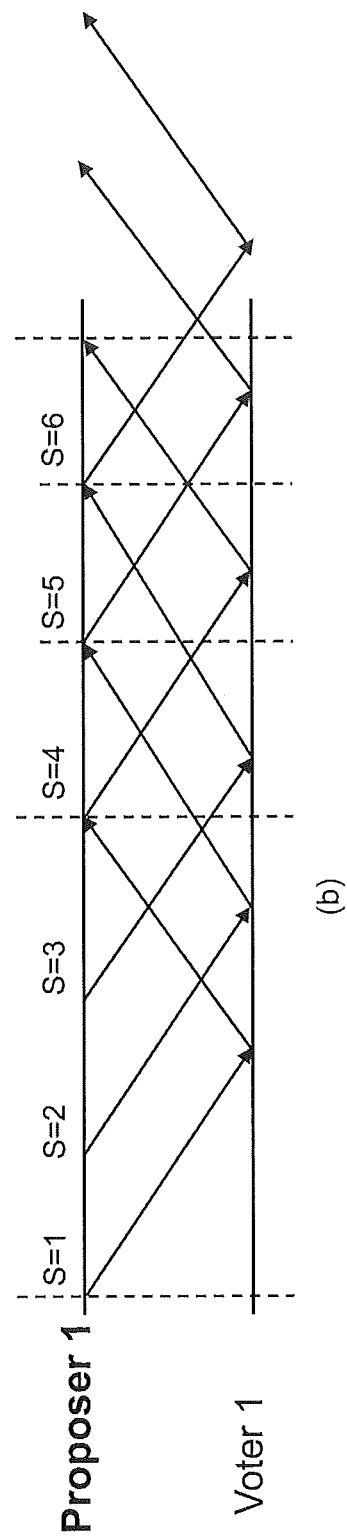

| Block # | 23 |
| --- | --- |
| Parent Hash | 0x04d76fe201b0a1d2651efb8e68f8de9989e3755l9782da46e4bfd3b350575f90 |
| Sequence Number (X, Y, Z) | (1, 3, 5) |
| Creation time | 2019-09-24 18:20:59 |
| Transactions | TX1...<br>TX2...<br>TX3...<br>TX4... |

Fig. 6

- Notarized chain: A chain whose blocks are all notarized
- Freshest notarized chain: The notarized chain whose last block has the largest block sequence number
- Finalized chain: The freshest notarized chain without the last K notarized blocks

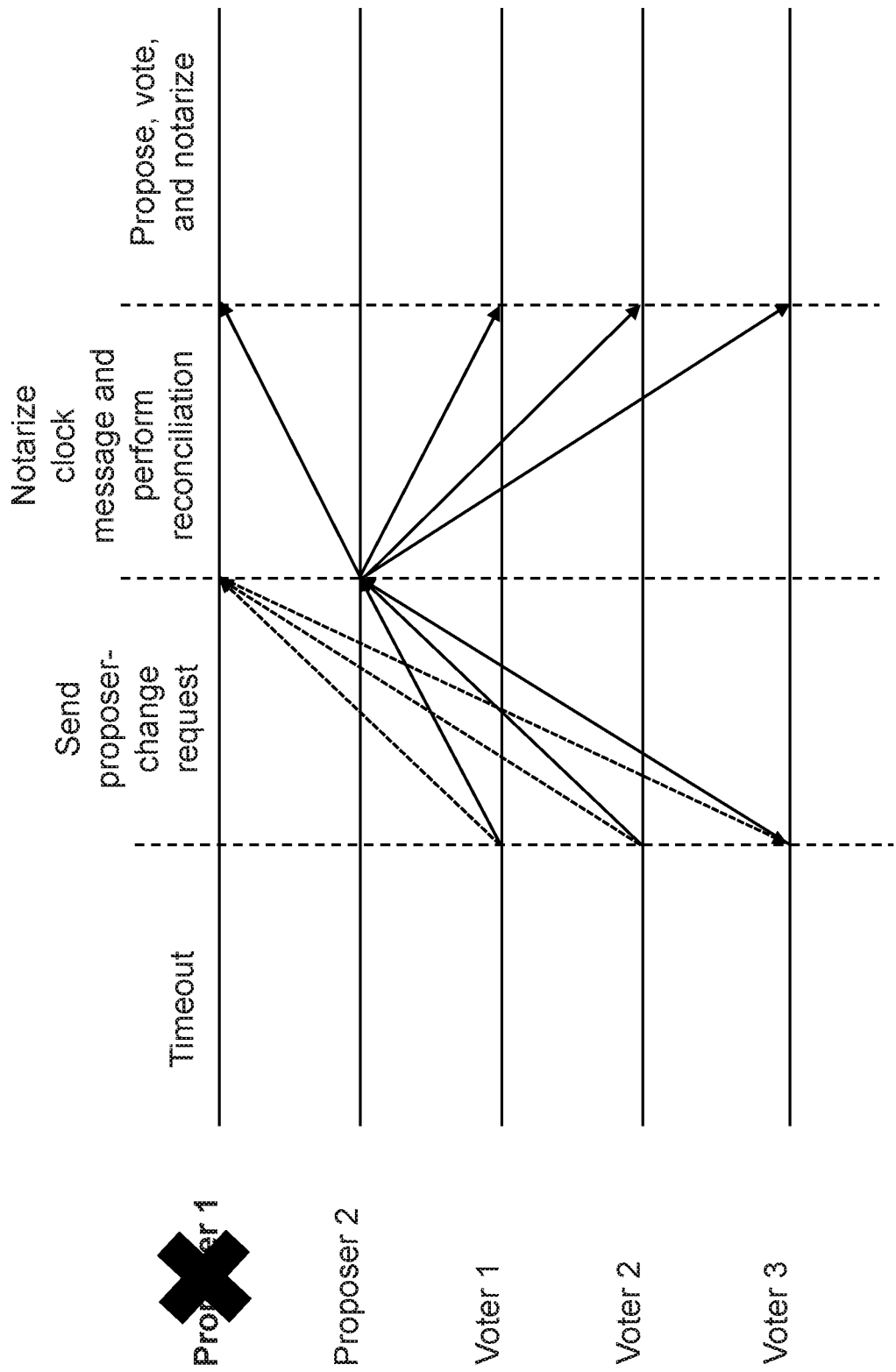

HIGH THROUGHPUT BLOCKCHAIN CONSENSUS SYSTEMS AND METHODS WITH LOW FINALIZATION TIME

CROSS-REFERENCE TO RELATED APPLICATION

This application claims the benefit of U.S. Provisional Application 62/738,791, filed Sep. 28, 2018, the entirety of which is herein incorporated by reference.

FIELD OF THE INVENTION

The present invention related to the field of blockchain consensus, and in particular, to blockchain consensus systems and protocols for increasing transaction throughput and expediting transaction finalization time.

BACKGROUND OF THE INVENTION

Distributed ledgers provided in peer-to-peer networks, such as the blockchain used in the Bitcoin and Ethereum cryptocurrency systems, rely on a consensus system agreed-upon by the participants on the peer-to-peer network in order to add blocks of data to the ledger. In such systems, participants examine a proposed block in order to verify that they conform to a network agreed standard, rather than relying on a third-party trusted central authority to authorize the addition.

Existing consensus systems, however, have several problems Proof of work systems require solving complex hashing algorithms using enormous, specialized hardware that consumes too much electricity. Such systems have led to a hashing-hardware arms race and creation of mining pools. Proof of stake systems are aimed to address the problems of proof of work systems. The idea behind proof of stake systems is to make control of the public ledger proportional to ownership stake of the digital currency. It is hoped that proof of stake systems will be more energy efficient and more appropriately distribute control over the public ledger. Such systems, however, can lead to creation of multiple chains or forks and there is no objective way to choose between them (Nothing-at-Stake problem). Practical Byzantine fault tolerance (PBFT) systems are another type of consensus systems. These systems are implemented through multiple rounds of participant voting, requiring messages in the network to be signed multiple times. This introduces computational overhead to calculate the signatures and disk-space overhead to store all the multiple signatures generated. Conventional consensus systems also have low throughput because they do not scale well to handle large transaction volumes. For example, Bitcoin and Ethereum can handle no more than 10 transactions per second. In contrast, Visa's transaction processing system can handle more than 200 transactions in the same amount of time. Pipelining can increase the throughput of consensus systems but it also complicates the transaction finalization process and lengthens the transaction finalization time. Therefore, traditionally this technique is known to hinder many important applications and is undesirable in blockchain technology.

Accordingly, there remains a need for blockchain consensus systems and protocols that are improved over the prior art.

SUMMARY OF THE INVENTION

In accordance with principles of the invention, a system that implements a blockchain consensus protocol is contemplated. In one embodiment, the system comprises a plurality of node computers and each node computer in the plurality includes a processor, memory storing computer instructions executable by the processor, and a network interface operatively coupled to the processor and a communications network connecting the plurality of node computers. The plurality of node computers are configured to create a blockchain containing transactions that is maintained by the plurality of node computers. The plurality of node computers includes a committee of node computers comprising proposer node computers and voter node computers.

The system is configured to provide a sequence number to a proposal or a block on the blockchain.

The committee is configured to perform a notarization process. In the notarization process, a proposer node computer in the committee is configured to prepare and send multiple unnotarized proposals, each including transactions, to the voter node computers in the committee. Each of the voter node computers in the committee is configured to sign a unnotarized proposal when the voter node computer has the same record of the blockchain as the proposer node computer and to send the signed proposal to the proposer node computer. The proposer node computer is configured to notarize a unnotarized proposal after the proposer node computer receiving a threshold number of signatures for the unnotarized proposal. A notarized proposal is a block added to the blockchain.

The proposer node computer is further configured to send the multiple unnotarized proposals to the voter node computers before the proposer node computer notarizes any proposal or receives any signature from the voter node computers.

The proposer node computer is further configured to send another unnotarized proposal after sending the multiple unnotarized proposals to the voter node computers after the proposer node computer notarizes a unnotarized proposal in the multiple unnotarized proposals.

The same record is a notarized chain whose last block has largest sequence number provided by the system.

The system is configured to determine a finalized chain from the notarized chain without a number of last blocks in the notarized chain, wherein the number of last blocks corresponds to the number of multiple unnotarized proposals sent by the proposer node computer and the finalized chain consists of blocks that are irreversible by node computers in the system.

In one embodiment, the sequence number of the block with the largest sequence number in the proposer node computer and the sequence number of the block with the largest sequence number in the voter node computer match.

In one embodiment, the sequence number of the block with the largest sequence number in the proposer node computer is at least the same as or greater than the sequence number of the block with the largest sequence number in the voter node computer.

In one embodiment, the committee is further configured to perform a reconciliation process. In the reconciliation process, a proposer node computer in the committee is configured to send a status request to the voter node computers in the committee requesting each voter node computer to provide blockchain information on each voter node computer, and each voter node computer is configured to send its blockchain information to the proposer node computer.

Further in the reconciliation process, the one proposer node computer is configured to send a data request to one of the voter node computers when the blockchain information the one proposer node computer has on the one voter node computer and the blockchain information on the one voter node computer are different after the proposer node computer receives the blockchain information on the one voter node computer.

Further in the reconciliation process, the one voter node computer is configure to provide missing blockchain information to the one proposer node computer so that the blockchain information the one proposer node computer has on the one voter node computer and the blockchain information on the one voter node computer match after the data request.

In one embodiment, the system is configured to perform the reconciliation process before any notarization process is performed.

In one embodiment, the threshold number of signatures is at least ⅔ of the total number of voter nodes in the committee.

In one embodiment, the threshold number of signatures is equivalent to a number of voter notes that together holds at least ⅔ of the total stake in the committee.

In one embodiment, the sequence number includes a first value indicating which committee is preforming a notarization process, a second value indicating which proposer in the committee is proposing proposals, and a third value indicating a block identification number.

In one embodiment, the voter node computers are configured send a proposer-change request to another proposer computer node in the committee after a period of time without receiving a proposal from the proposer node computer.

In one embodiment, the other proposer computer s configured to receive proposer-change requests and notarize the proposer-change requests after receiving a threshold number of proposer-change requests.

In one embodiment, the other proposer computer is configured to instruct the voter node computers to advance their epoch value. The voter node computers are configured to receive proposals from the other proposer computer after their epoch value advances.

In one embodiment, the proposer computer nodes and the voter node computers are selected from a group of candidate nodes based a bid transaction they submitted. Each candidate node submits a bid transaction specifying an amount of stake to be put in an escrow and indicating whether it wants to be a proposer node computer or a voter node computer, and the system selects a number of candidate nodes with highest stakes to be proposer node computers and voter node computers.

In one embodiment, the system is configured to select a new committee including proposer node computers and voter node computers pursuant to an election scheme. The system is configured to replace the committee with the new committee by having a threshold number of voter node computers in the committee and a threshold number of voter node computers in the new committee signing a proposal or after a number of blocks.

In accordance with principles of the invention, a computer-implemented method or blockchain consensus protocol is contemplated. The method comprises implementing a blockchain consensus software application in a plurality of node computers. Each node computer in the plurality includes a processor, memory storing computer instructions executable by the processor, and a network interface operatively coupled to the processor and a communications network connecting the plurality of node computers. The application configures the plurality of node computers to create a blockchain containing transactions that is maintained by the plurality of node computers and to form a committee of node computers comprising proposer node computers and voter node computers.

The blockchain consensus software application includes computer instructions stored in the memory that are executable by the processor to perform computer-implemented steps comprising providing a sequence number to a proposal or a block on the blockchain. The steps also comprise performing a notarization process comprising configuring a proposer node computer in the committee to prepare and send multiple unnotarized proposals, each including transactions, to the voter node computer. The steps also comprise configuring each of the voter nodes in the committee to sign an unnotarized proposal when the voter node computer has the same record of the block chain as the proposer node computer and to send the signed proposal to the propose node computer. The steps also comprise configuring the proposer node computer to notarize a unnotarized proposal after the proposer node computer receiving a threshold number of signatures for the unnotarized proposal. A notarized proposal is a block added to the blockchain.

The steps further comprise sending, by the proposer node computer, the multiple unnotarized proposals to the voter node computers before the proposer node computer notaries any proposal or receives any signature from the voter node computers.

The steps further comprise sending, by the proposer node computer, another unnotarized after sending the multiple unnotarized proposals proposal to the voter node computers after the proposer node computer notarizes a unnotarized proposal in the multiple unnotarized proposals;

The same record is a notarized chain whose last block has largest sequence number provided by the application.

Additionally, the steps comprise determining a finalized chain from the notarized chain without a number of last blocks in the notarized chain. The number of last blocks corresponds to the number of multiple unnotarized proposals sent by the proposer node computer and the finalized chain consists of blocks that are irreversible by node computers in the plurality.

In accordance with the principles of the invention, a non-transitory computer readable medium embodiment is contemplated. The medium stores an application that can cause a computer to execute a process. The process comprises implementing a blockchain consensus software application in a plurality of node computers. Each node computer in the plurality includes a processor, memory storing computer instructions executable by the processor, and a network interface operatively coupled to the processor and a communications network connecting the plurality of node computers. The application configures the plurality of node computers to create a blockchain containing transactions that is maintained by the plurality of node computers and to form a committee of node computers comprising proposer node computers and voter node computers.

The blockchain consensus software application includes computer instructions stored in the memory that are executable by the processor to perform computer-implemented steps comprising providing a sequence number to a proposal or a block on the blockchain. The steps also comprise performing a notarization process comprising configuring a proposer node computer in the committee to prepare and send multiple unnotarized proposals, each including transactions, to the voter node computer. The steps also comprise configuring each of the voter nodes in the committee to sign an unnotarized proposal when the voter node computer has the same record of the block chain as the proposer node computer and to send the signed proposal to the propose node computer. The steps also comprise configuring the proposer node computer to notarize a unnotarized proposal after the proposer node computer receiving a threshold number of signatures for the unnotarized proposal. A notarized proposal is a block added to the blockchain.

The steps further comprise sending, by the proposer node computer, the multiple unnotarized proposals to the voter node computers before the proposer node computer notaries any proposal or receives any signature from the voter node computers.

The steps further comprise sending, by the proposer node computer, another unnotarized after sending the multiple unnotarized proposals proposal to the voter node computers after the proposer node computer notarizes a unnotarized proposal in the multiple unnotarized proposals;

The same record is a notarized chain whose last block has largest sequence number provided by the application.

Additionally, the steps comprise determining a finalized chain from the notarized chain without a number of last blocks in the notarized chain. The number of last blocks corresponds to the number of multiple unnotarized proposals sent by the proposer node computer and the finalized chain consists of blocks that are irreversible by node computers in the plurality.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which:

FIG. 4 depicts another illustrative notarization process in accordance with some embodiments of the present invention;

FIGS. 5a-5b depict illustrative simplified proposal transmission and voting process when K equals 1 and when K equals 3, respectively, in accordance with some embodiments of the present invention;

FIG. 6 depicts an illustrative block including a sequence number provided by the blockchain system in accordance with some embodiments of the present invention;

FIG. 10 depicts an illustrative proposer switching process chain in accordance with some embodiments of the present invention.

DETAILED DESCRIPTION OF THE INVENTION

Figure 1:
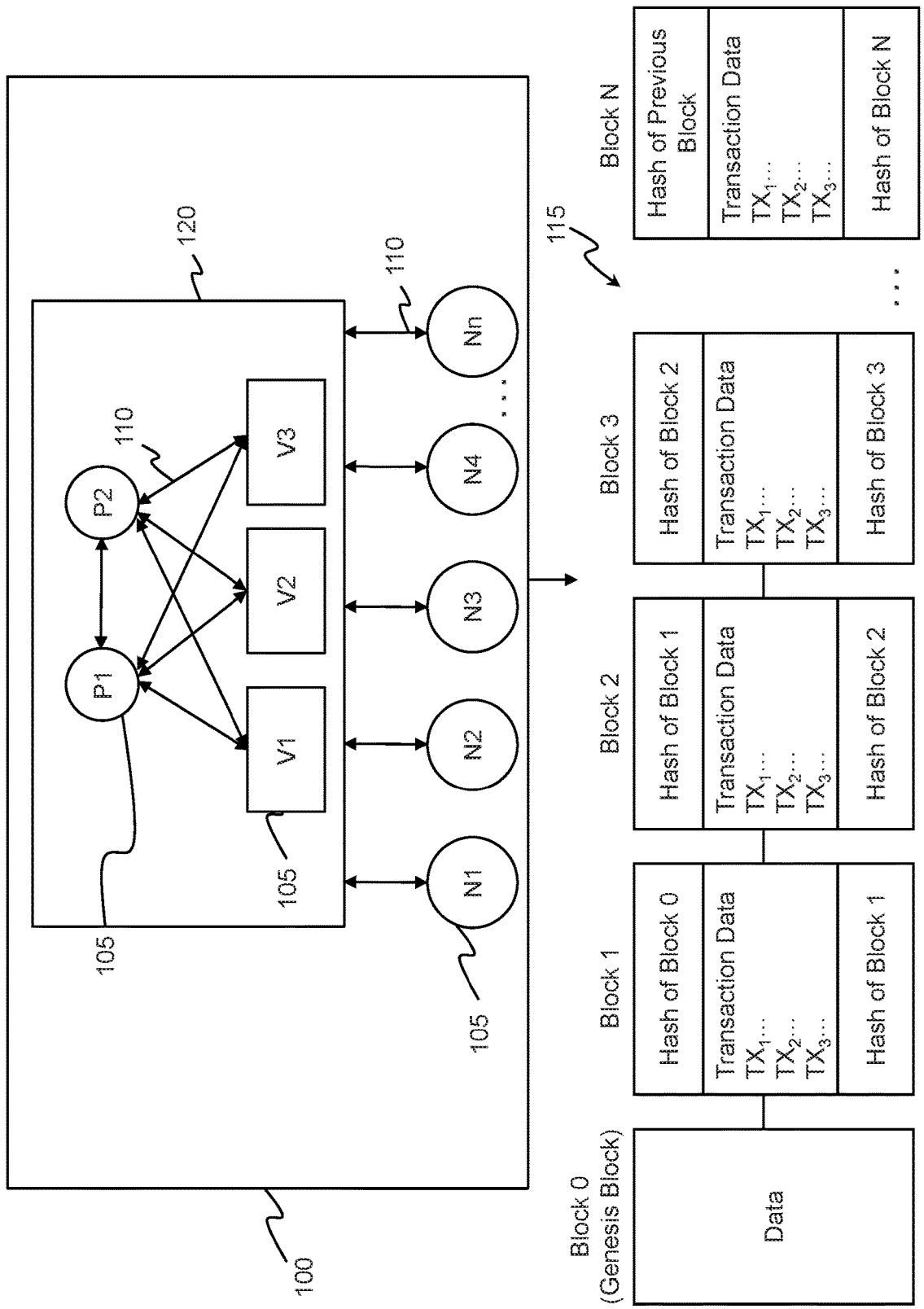
FIG. 1 depicts an illustrative blockchain system in accordance with some embodiments of the present invention.

FIG. 1 depicts an illustrative blockchain system 100 of the present invention. The blockchain system 100 includes a plurality of node computers 105 and a communications network 110 connecting the plurality of node computers 105. Each node computer n the plurality includes a processor, memory storing computer instructions executable by the processor, and a network interface operatively coupled to the processor and the communications network 105 which may be a wide area network such as the Internet. The blockchain system 100 is implemented with a blockchain consensus software application (blockchain consensus protocol). The blockchain consensus software application is adapted to connect to the plurality of node computers 105 through the communications network 110. The blockchain consensus software application configures the blockchain system 100 to operate in the manners described in this application.

Through the software application, node computers 105 can operate to reach a consensus on adding transactions to an overall transaction record 115 maintained by the blockchain system and have an agreement on what the overall transaction record 115 is. Each node 105 n the blockchain system may be referred to as a consensus node. The transactions may be cryptocurrency transaction such as bitcoin transactions (represented by "TX . . . " in FIG. 1). The overall transaction record 115 is where all the transactions through the blockchain system 100 is stored. The overall transaction record 115 is kept in the form of a blockchain. Node computers 105 in the blockchain system have its own copy of the overall transaction record or blockchain 115. A node computer might have a different copy of the overall blockchain temporarily, but node computers will eventually agree on a same overall blockchain. For example, a node 105 might have a blockchain consist of A, B, and C at time 1 and another node 105 might have a blockchain consisted of A, B, D at the same time. After a period of time, both nodes will both agree on an overall blockchain consists of A, B, and C. Their copy of the blockchain will also be updated accordingly. The blockchain means a distributed ledger in which transactions are maintained across several node computers that are linked and immutable in a peer-to-peer network.

Figure 2:
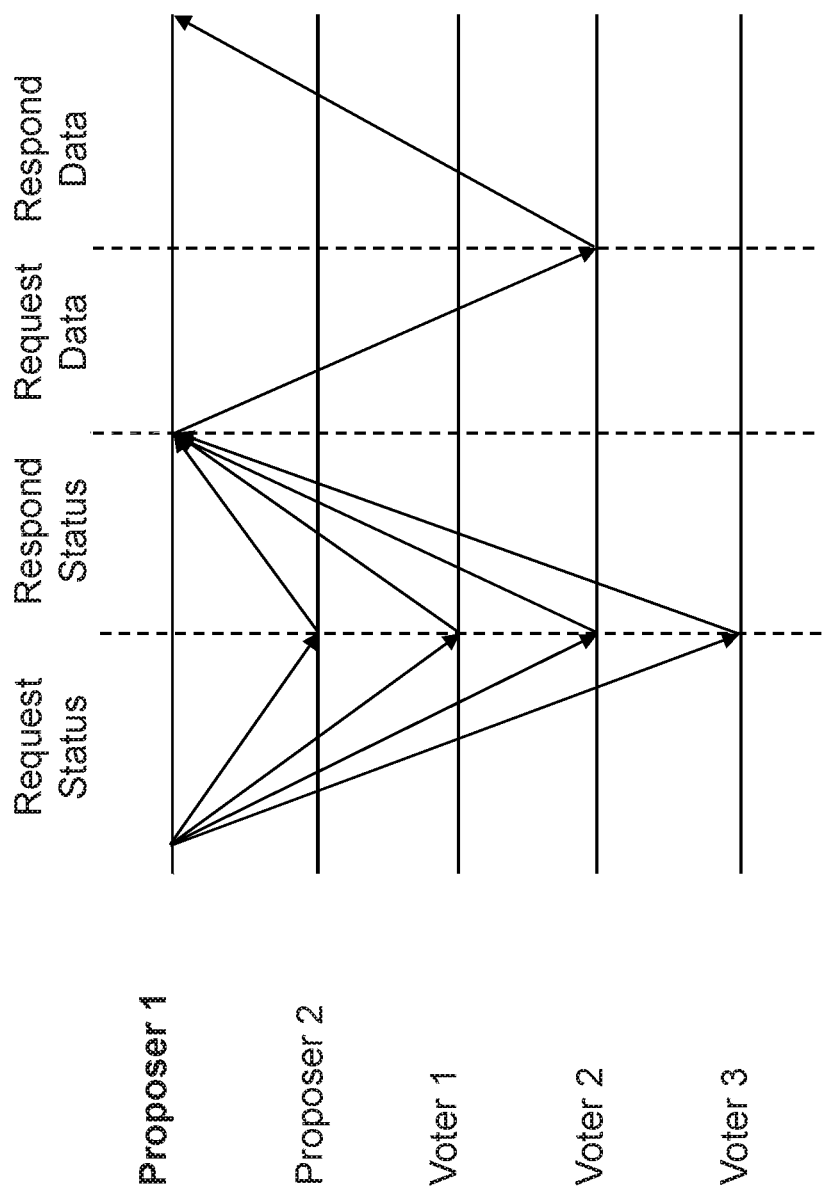
FIG. 2 depicts an illustrative reconciliation process in accordance with some embodiments of the present invention.

The blockchain system 100 involves a committee of consensus nodes 120 which includes a plurality of proposer nodes and a plurality of voter nodes. Although FIG. 1 shows that there are two proposer nodes (P1 and P2) and three voter nodes (V1, V2, and V3), it is understood that the committee 120 may be made up of other number of proposer nodes and voter nodes. In one embodiment, proposer nodes (P1 and P2) are configured to communicate with other nodes in the committee 120 (proposer and voter nodes), whereas voter nodes (V1, V2, V3) are configured to communicate with proposer nodes but not the other voter nodes. The committee 120 is configured to perform a reconciliation process. A reconciliation process is a process in which a proposer node checks whether it has each voter node's latest blockchain information or if the blockchain information of each voter node stored on the proposer node matches that on the corresponding voter node. In one embodiment, blockchain information includes the freshest notarized chain known to each node, which is discussed later in the application. If they do not match, then the proposer node requests (status request) that voter node to provide the missing or additional information so that the proposer node can be updated to have the current information of that node. FIG. 2 depicts an illustrative reconciliation process. Proposer node 1 can send a status request message to each of the voter nodes requesting each voter node to provide blockchain information currently stored on or known to that voter node. After each voter node provides its blockchain information, proposer node 1 notices that its information on voter node 2's blockchain information (e.g., consists of 4 blocks) is behind the current blockchain information on voter node 2 (e.g., consisted of 5 blocks). The proposer node then requests (data request) voter node 2 to provide the missing information (e.g., information of the $5^{th}$ block) and voter node 2 provides it. Proposer node 1 and voter node 2 will now have the same information (i.e., the proposer node knows that the blockchain of voter node 2 is 5 blocks and the blockchain of voter node 2 is 5 blocks). A proposer node can update its blockchain information by requesting the missing information from any of the nodes in the committee. A voter node can update its blockchain information by requesting the missing information from any of the proposer nodes in the committee, but not from other voter nodes in the committee.

To determine if a proposer node and a voter node have matching information or chain data, the proposer node checks whether the blockchain information it has on that node matches to that of the voter chain. In one embodiment, the proposer node checks whether its freshest notarized chain matches that of the voter node. Each block created by the blockchain system may be provided with a sequence number. The latest block of a blockchain is the one with the largest sequence number. For example, in a blockchain that includes a first block with a sequence number of (1, 1, 1), a second block with a sequence number of (1, 1, 2), and a third block with a sequence number of (1, 1, 3), the third block is the latest block. The latest block may also be referred to as the freshest head. The proposer node compares the latest block it has on the voter node with the latest block on the voter node and determine if they have the same sequence number. If they are the same, then the proposer node and the voter node have matching chain data. If the sequence number of the latest block on the voter node is larger than that of the proposer node has on the voter node, the proposer node fetches the missing block(s). In one embodiment, after performing the reconciliation process, the proposer node's freshest notarized chain matches that of the voter node's freshest notarized chain, or vice versa. The sequence number feature is discussed in more detail later in the application.

The reconciliation process may also be referred to as a chain syncing process. This feature addresses the problem with blockchain systems might lose network messages during transmission, when a node crashes, etc.) and eliminates the need to implement a blockchain system that can deliver each and every single network message. The node with old chain data can pick up newest chain data from peer nodes. Status messages, bid messages, proposals, voted proposals, and notarized proposals (described below) and other messages used by proposer nodes and voter nodes to communicate with each other are network messages. New consensus node that just joined the blockchain system (e.g., by installing the blockchain consensus software application on that computer) can also pick up the latest overall blockchain information using this method. The new consensus node may be updated gradually until it receives the newest chain information or the complete overall blockchain.

Figure 3:
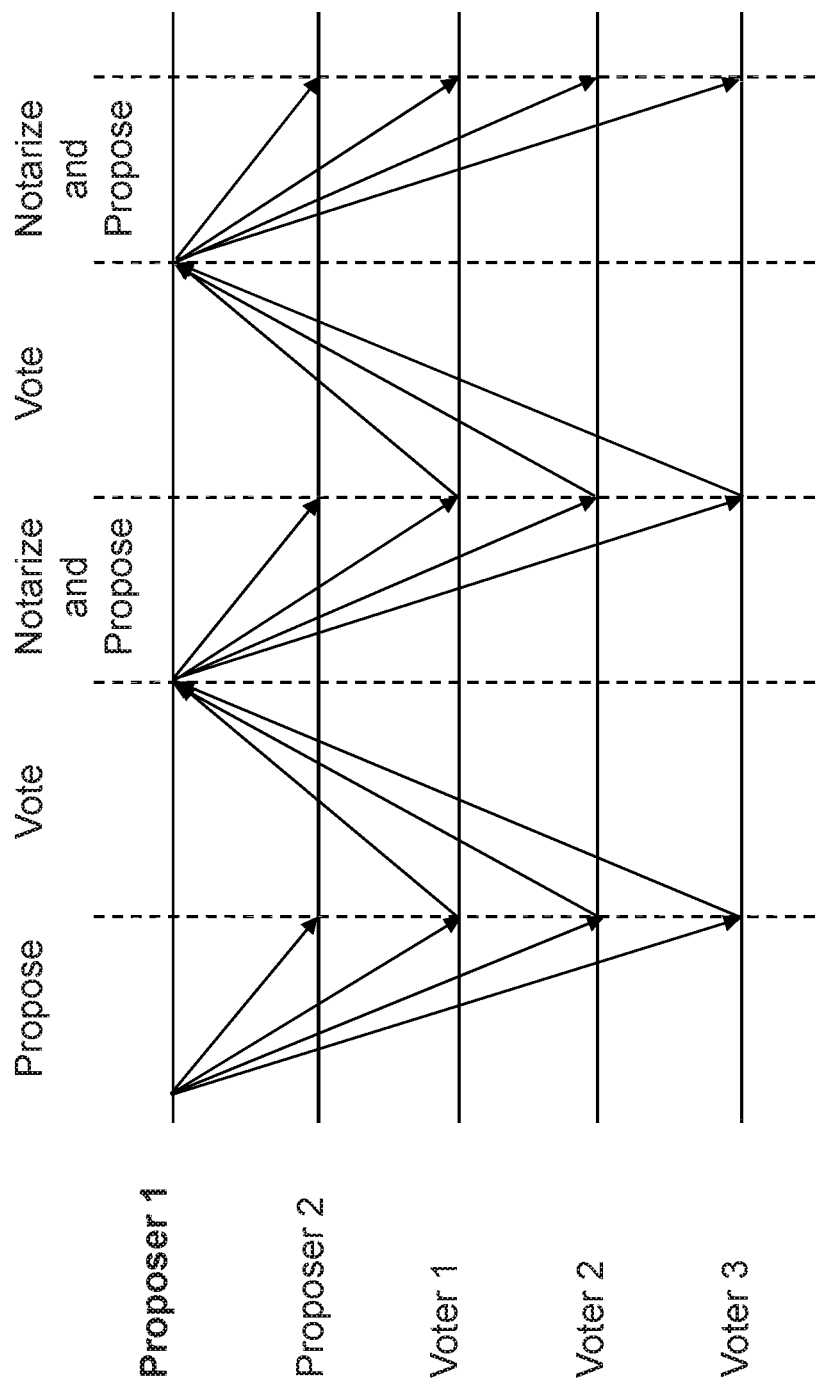
FIG. 3 depicts an illustrative notarization process in accordance with some embodiments of the present invention.

The committee 120 is also configured to perform a notarization or voting process. Nodes N1-Nn in FIG. 1 are nodes that submit transactions to the committee 120 for notarization. The submitted transactions are held in a memory pool (or transaction pool) to be picked up from a proposer node. FIG. 3 depicts an illustrative notarization process. A proposer node selects transactions from the memory pool and prepares an electronic block containing the selected transactions to be added to a blockchain. The prepared block may be referred to as a candidate block or proposal. The proposer node then signs the proposal and sends the signed proposal to the plurality of voter nodes V1, V2, V3.

Voter node is configured to vote or sign the proposal after it validates the proposal and when it and proposer node have the same freshest notarized chain. The concept of freshest notarized chain is described later in the application. After signing the proposal, voter node sends the signed proposal to the proposer node. After receiving enough signatures from the voter nodes in the plurality, the proposer node notarizes the proposal (adds the candidate block to the blockchain). The required number of signatures for notarization is preferably ⅔ of the total number of voter nodes in the plurality but other numbers are also contemplated. This is a vote-by-seat scheme. Other voting schemes are also contemplated such as vote-by-stake scheme. In vote-by-stake scheme, the notarization threshold could be configured to be votes from voter nodes holding ⅔ of stake in the committee. For example, if the committee includes six voter nodes and two of the six voter nodes hold ⅔ or more of stake in the committee, votes from those two nodes are sufficient to have the proposal notarized (instead of four votes). The notarized proposal is then added to the freshest notarized chain, or the head of the freshest notarized chain (the block with the largest sequence number). After notarization, the proposer node can then send another proposal to the voter nodes for notarization.

The proposer node is configured to prepare and transmit one or more proposals, preferably two or more proposals before the first proposal is notarized. Such proposals may be referred to as unnotarized proposals. FIG. 3 depicts an illustrative notarization process with the number of unnotarized proposals K equals to 1. FIG. 4 depicts an illustrative notarization process with the number of unnotarized proposals K equals to 3. In FIG. 4, the proposer node may be allowed to prepare and send up to three proposals or unnotarized proposals. The proposer node may send a first proposal at time 1, a second proposal at time 2, and a third proposal at time 3 before it receives the required number of signatures for the first proposal. The proposer can prepare and send another proposal (the $4^{th}$ proposal) after receiving enough signatures for the first proposal. The proposer can then prepare and send yet another proposal (the $5^{th}$ proposal) after receiving enough signatures for the second proposal and so forth. The blockchain system can process a maximum K number of proposals at any given time without requiring the blockchain system to first finish processing a proposal (e.g., finish notarizing a proposal). Conventional blockchain systems require a proposal to be notarized first before a second proposal can be transmitted to the voter nodes.

FIGS. 5a-5b depict simplified proposal transmission and voting process when K equals and when K equals 3, respectively.

The committee 120 may perform a reconciliation process before the committee can perform any notarization process. The committee 120 may also be configured to perform a reconciliation process periodically after the initial notarization process. The reconciliation process can be implemented as a request-response process (FIG. 2) or a broadcast your status updates process. In the latter process, the voter nodes are configured to send their blockchain information to the proposer node (without request from the proposer node). The voter nodes may send their blockchain information to the proposer node when their blockchain information changes. In one embodiment, the voter nodes may send their blockchain information to proposer node when their freshest notarized chain changes. The voter nodes may also send their updated local epoch value to the proposer node when their local epoch value changes.

After notarization (whether it is notarization for K equals 1 or notarization for the first proposal in K equals 3), the proposer node can then send another proposal to the voter nodes for notarization. This subsequent notarization may be understood as the proposer node knows that ⅔ of voter nodes know that ⅔ of voter nodes agree on the previous notarized block (assuming that the threshold requirement for notarization is ⅔).

The blockchain system ay provide a sequence number to a notarized block or other blocks. In one embodiment, the sequence number is defined by a session value, an epoch value, and a block identification value. The sequence number may be provided in the form of (Session Value, Epoch Value, Block Identification Value). FIG. 6 depicts an illustrative block with a sequence number provided by the blockchain system. The session value identifies the committee that notarized the block. The epoch value identifies the proposer node that proposed the candidate block. The block identification value identifies the block and increases sequentially as a block is notarized or otherwise created. Session value may have the highest weight, epoch value may have an intermediate weight, and block identification value may have the lowest weight in determining whether a sequence number is larger than another. For example, (1, 1, 2) is larger than (1, 1, 1). For another example, (1, 2, 1) is larger than (1, 1, 1). For yet another example, (2, 1, 1) is larger than (1, 2, 1). Block identification value may also be referred as a value used to count the provided sequence numbers. Block identification value may restart from 1 in some conditions such as when the epoch value changes. The sequence number can be used to track the operation of the blockchain system and determine the boundary or length of the freshest notarized chain and other chains such as the notarized chain and finalized chain. The block in FIG. 6 includes other data fields such as block number (a sequentially increasing integer that can only get larger along a blockchain), parent hash, time creation, and transaction data.

Figure 7:
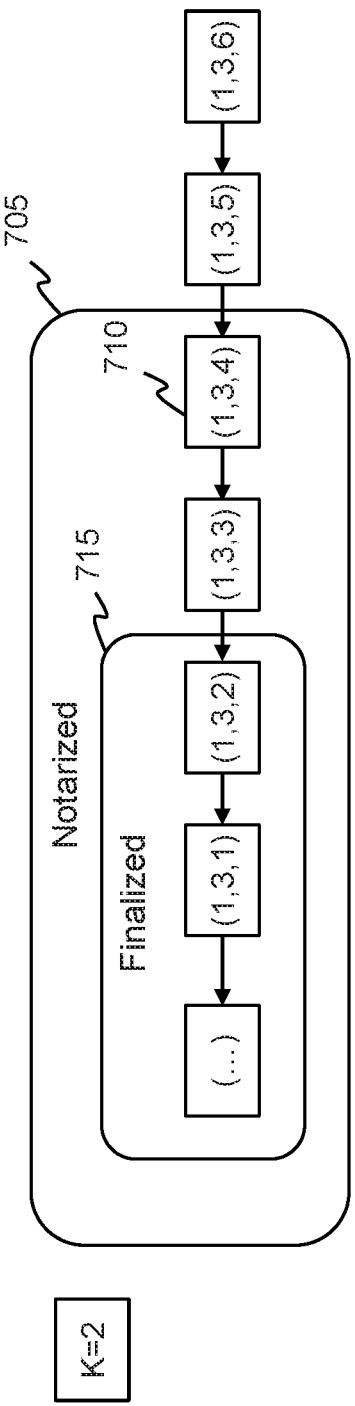
FIG. 7 depicts illustrative notarized chain, freshest notarized chain, and finalized chain in accordance with some embodiments of the present invention.

The freshest notarized chain refers to a notarized chain whose last block has the largest sequence number. The last block with the largest sequence number may be referred to as the head block or simply the head. FIG. 7 depicts an illustrative freshest notarized chain 705. Chain 705 is the freshest notarized chain because its head block 710 has the largest sequence number. There may be other notarized chains such as having a head block of (1, 3, 3) but chain 705 is the freshest one since its head block is (1, 3, 4).

The freshest notarized chain or the head block of the freshest notarized chain is used to determine when the voter node would vote on a proposal, or when the proposer node and the voter node have the same record of the blockchain. Same record means blockchain records match or substantially match as described below.

Figure 8:
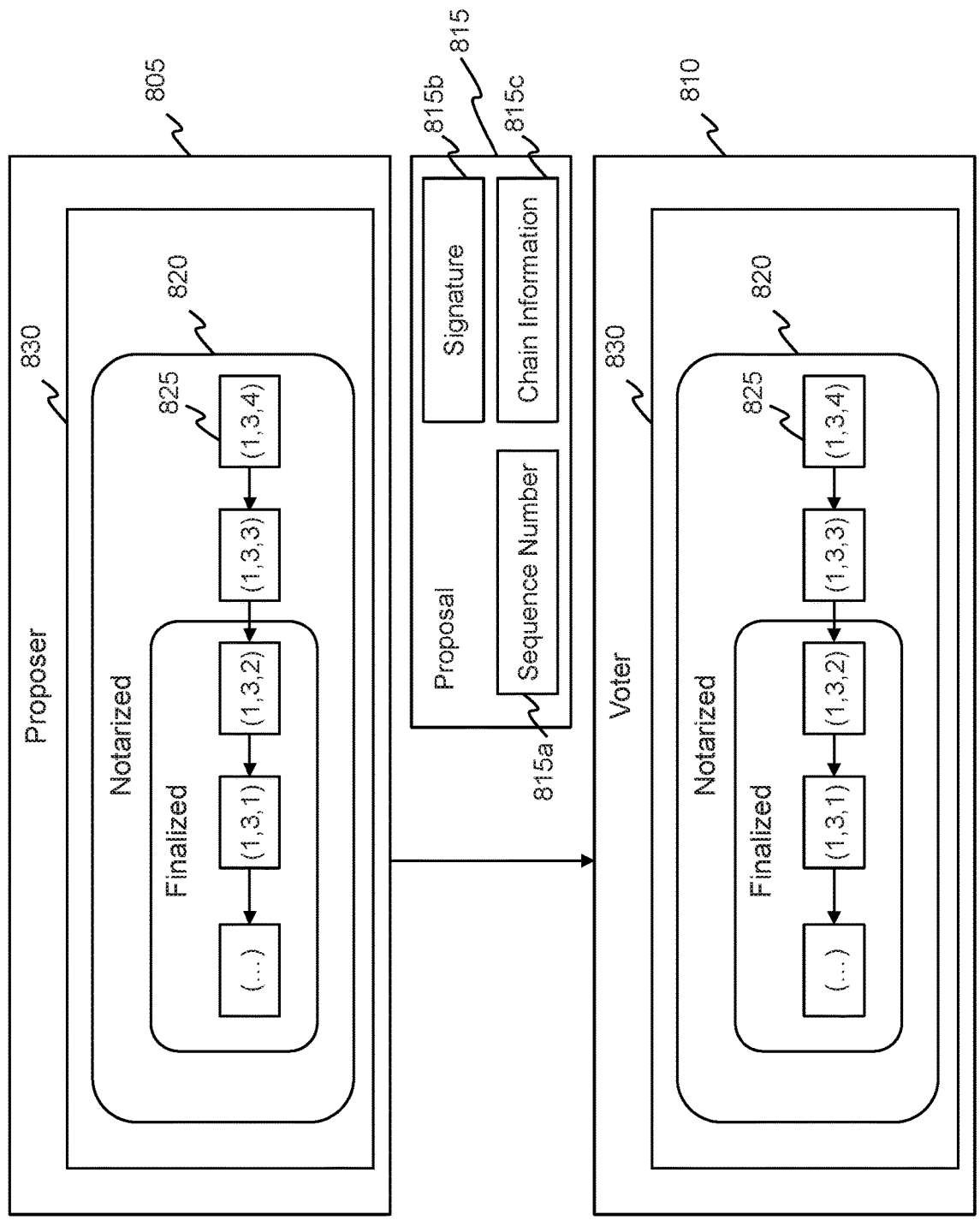
FIG. 8 depicts an illustrative voting rule in accordance with some embodiments of the present invention.

In one embodiment, the voter node votes on a proposal when the local copy or record of the blockchain in the proposer node matches that of the voter node. In particular, the voter node votes on a proposal when the freshest notarized chain in the local record of the proposer node matches that of the voter node, or when the head block of their freshest notarized chains match. FIG. 8 illustrates this concept. The voter node 810 checks whether they match when it receives a proposal 815 from the proposer node 805. The proposal 815 includes its sequence number 815a, the proposer node's signature 815b, and chain information 815c providing information on the freshest notarized chain 820 or the head block of the freshest notarized chain 820 stored in the proposer node 805. Upon receiving the proposal 815, the voter node 810 uses chain information 815c to determine whether their freshest notarized chains 820 or the head blocks 825 of their freshest notarized chains 820 match. When they match, such as in this case, the voter node 810 votes on the proposal 815. Matching head block means that the sequence numbers of both head blocks match (e.g. (1, 3, 4) of block 825 in proposer 805 and (1, 3, 4) of block 825 in voter node 810 matches). In some embodiments, matching head block means that the sequence numbers of both head blocks match and that the hashes of the transactions in both head blocks match. Blockchain information 820 in the proposer node 805 and voter node 810 may be stored in a transient storage device (e.g., memory) or a permanent storage device (e.g., hard drive) 830. Chain information 815c, in one embodiment, is a pointer pointing to the head block of the freshest notarized chain in the proposer node 805.

The voter node 810 also checks signature 815b to ensure that the proposal 815 comes from the correct proposer or proposer 805 (e.g., if proposer 805 matches the current epoch value of voter 810).

Figure 9:
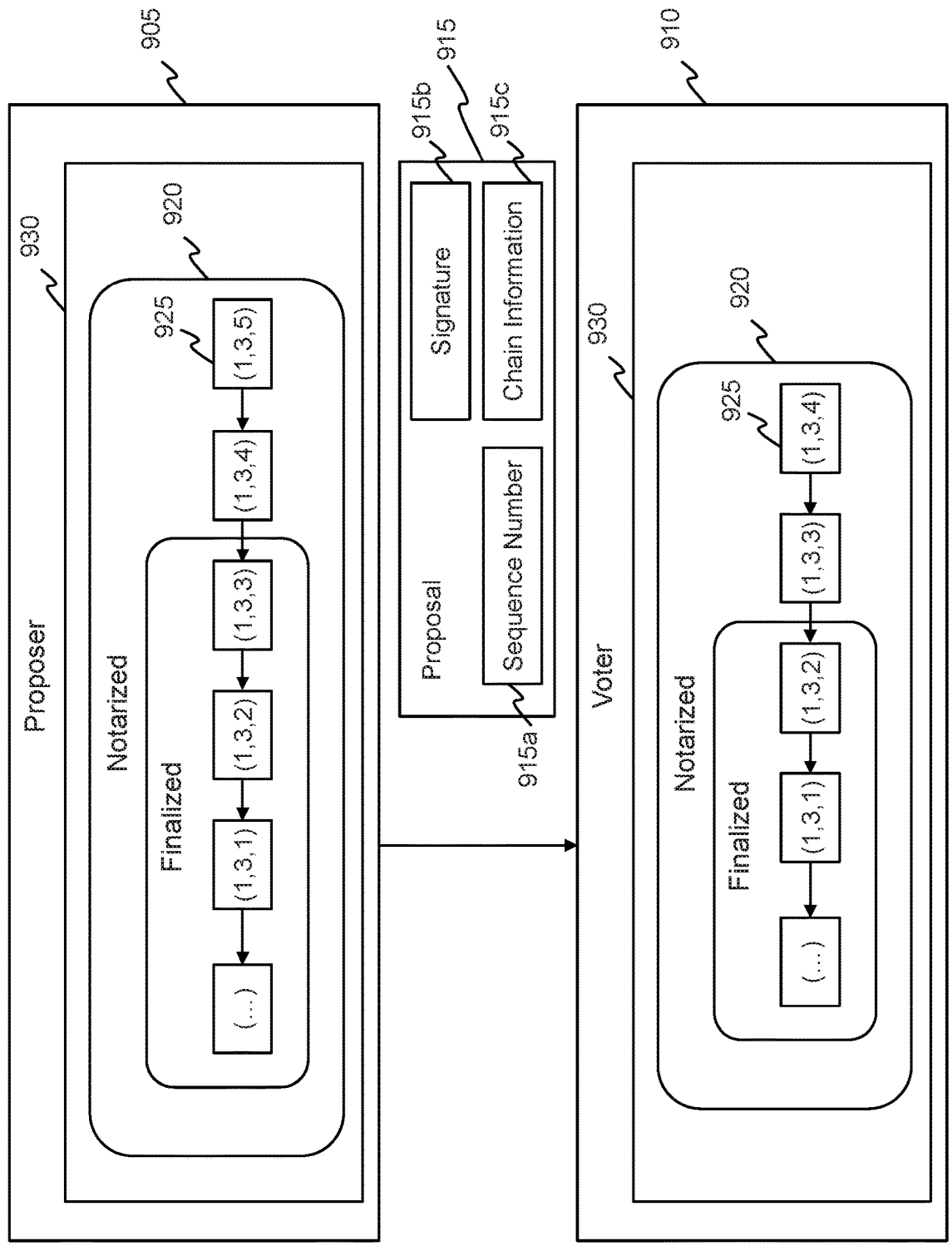
FIG. 9 depicts another illustrative voting rule in accordance with some embodiments of the present invention.

In another embodiment, the voter node votes on a proposal when the freshest notarized chain in the local record of the proposer node substantially matches that of the voter node, or when the head block of their freshest notarized chains substantially match. In some situations, their freshest notarized chains or heads might differ slightly but the voter node would still vote on a proposal. FIG. 9 illustrates this concept. The voter node 910 checks whether they substantially match when it receives a proposal 915 from the proposer node 905. The proposal 915 includes its sequence number 915a, the proposer node's signature 915b, and chain information 915c providing information on the freshest notarized chain 920 or the head block freshest notarized chain 920 of the stored in the proposer node 905. Upon receiving the proposal 915, the voter node 915 uses chain information 915c to determine whether their freshest notarized chains 920 or the head blocks 925 of their freshest notarized chains 820 substantially match. The head block 925 in the voter node 910 is smaller than that of the head block 925 in the proposer node 905 (one block smaller). This may be caused by the proposer node 905 received another notarization and the blockchain information on the voter node 910 has not been updated yet. Since they differ by only one block or they substantially match, the voter node 910 can vote on the proposal 915. In some embodiments, the difference can be two or more blocks. In some embodiments, substantially match means that the sequence number of the head block in the proposer node is at least the same or greater than the sequence number of the head block in the voter node. Substantially match may also be referred to as the head block of the freshest notarized chain in the proposer node is as large as the head block of the freshest notarized chain in the voter node. If the sequence number of the head block in the proposer node subsequently gets larger or slightly larger than that of the head block in the voter node, the voter node would still vote. In some embodiments, the sequence number of the head block in the proposer node can be smaller than that of the voter node.

Like FIG. 8, blockchain information 920 in the proposer node 905 and voter node 910 may be stored in a transient storage device (e.g., memory) or a permanent storage device (e.g., hard drive) 930. Chain information 915c, in one embodiment, is a pointer pointing to the head block of the freshest notarized chain in the propose node 905. The voter node 910 also checks signature 915b to ensure that the proposal 915 comes from the correct proposer or proposer 905 (e.g., if proposer 905 matches the current epoch value of voter 910).

In yet another embodiment, the head block may be the head block known to or recorded by a voter node right before timeout or it sends the proposer-change request or clock message. After voter node advances its epoch value, voter node will vote on the next proposal and the next proposal, after notarization, will extend from that head block. Timeout, proposer-change request, epoch value advancement are described later in the application.

A notarized chain refers to a blockchain whose blocks are all notarized pursuant to the voting method described above. A finalized chain refers to the freshest notarized chain without the last K number blocks. In one embodiment, the last K number blocks refers to the last K normal blocks.

In one embodiment, a normal block is a block that is not a timeout block. A timeout block is the first block of an epoch. For example, block with sequence number (1, 1, 1), block with sequence number (1, 2, 1), and block with sequence number (2, 1, 1) are all timeout blocks since the last value in their sequence number is 1. As such, block with sequence number (1, 1, 1+N), block with sequence number (1, 2, 1+N), and block with sequence number (2, 1, 1+N) are all normal blocks where N is greater than 0. In one embodiment, a normal block satisfies the condition that if the parent block of the normal block has the sequence number (Session, Epoch, i), then the normal block has the sequence number (Session, Epoch, and i+1). The parent block is the block immediately before the normal block. In other words, a normal block has the same session and epoch value of its parent block and the block identification number is one greater.

FIG. 7 shows an example with K equals 2 and the freshest notarized chain without the last two (or largest) blocks is the finalized chain 715. A finalized block or chain means that the transactions in the block or chain is irreversible. The transactions therein stay permanently on the blockchain and cannot be revoked, discarded, or manipulated by any nodes on the blockchain system. A finalized block or chain is kept and agreed by every consensus node in the blockchain system. A finalized chain is a ledger that is identical to every consensus node in the blockchain system. A notarized block or chain may be considered as a block or chain waiting to be finalized.

In short, the blockchain system 100 involves a committee 120 of consensus nodes to add blocks to the overall blockchain 115 maintained by the blockchain system. The committee 120 conducts a voting process to add blocks to the blockchain 115. The committee 120 includes proposer nodes and voter nodes, and a proposer node P1 or P2 can send multiple unnotarized proposals to the voter nodes (or up to a maximum number allowed by the blockchain system) without requiring a proposal to be notarized first. The voter nodes V1, V2, V3 each will vote on a proposal after validation and when each and the proposer node have the same freshest notarized chain. A threshold number of votes (e.g., ⅔) is required to notarize the proposal. A notarized proposal is added to the blockchain and a notarized chain can be established or extended. A finalized chain is determined from the notarized chain.

By configuring a proposer node to send multiple unnotarized proposals (K number of unnotarized proposals) before the proposer node receiving any notarized proposal, a voter node to vote on an unnotarized proposal when that voter node and the proposer node have the same freshest notarized chain, and the blockchain system to determine a finalized chain from a freshest notarized chain without the last K number of notarized blocks, the blockchain system and consensus protocol have high throughput (the number of transactions the system and protocol can handle per second) and low finalization time (the amount of time to reach consensus of the finalized chain, or to have transactions permanently recorded on the blockchain).

The discussion will now be directed to the aforementioned timeout, proposer-change request, epoch value advancement. The epoch value identifies the proposer node from which the voter node received the proposal. For example, one of the proposer nodes may have a local epoch value of 1 identifying that proposer node and another one of the proposer nodes may have a local epoch value of 2 identifying that proposer node. Each of the voter nodes also includes local epoch value (e.g., 1) identifying the proposer node from which it should receive proposals (e.g., proposer 1). The epoch value is provided and stored locally in each node. Each of the nodes do not know the epoch value in the other nodes even if they have the same epoch value. For example, referring to FIG. 1, proposer node P1 has a local epoch value of 1 but it has no knowledge that proposer node P2 has a local epoch value of 2 and that each of the voter nodes V1, V2, V3 currently have a local epoch value of 1. Likewise, propose node 2 has a local epoch value of 2 but it has no knowledge that proposer node P1 has a local epoch value of 1 and that each of the voter nodes currently have a local epoch value of 1. Moreover, each of the voter nodes currently has a local epoch value of 1 but it has no knowledge that the other voter nodes also have a local epoch value of 1. The committee 120 is set up in a manner such that each proposer node can communicate with other proposer nodes and voter nodes in the committee and that each voter node can communicate with proposer nodes but not the other voter nodes in the committee.

The voter nodes can switch the proposer node (e.g., P1) from which they receive proposals to a different proposer node (e.g., P2) within the committee 120 by advancing their local epoch value. Each of the voter nodes may be configured to have an epoch function for determining the next epoch value such as current epoch value +1. If the current epoch value in a voter node is 1, then the voter node sends a proposer-change request with epoch value 2 to the new proposer node associated with epoch value 2. After the new proposer node receives enough requests, the new proposer nodes notarizes the proposer-change requests and notifies the voter nodes that the change is approved. After receiving the approval, the voter nodes then advance their current epoch value 1 to the next epoch value 2 and would start receiving proposals from the new proposer node associated with epoch value 2. The new epoch value is 2 because the current epoch value in the voter node is 1 and the epoch function is current epoch value +1. In some embodiments, instead of relying on an epoch function, the reception of a notarization of a proposer-change request with an epoch value larger than the node's local epoch value would cause that node to advance its epoch value to the value that is in the notarized request. The epoch value in the notarized request is larger than the local epoch value of the node. The notarization of proposer-change requests serves as proof of the other nodes perception and collective decision.

The required number of requests for switching is preferably ⅔ of the total number of voter nodes in the plurality but other numbers are also contemplated. The voter nodes may want to change the proposer node in certain conditions such as when the proposer node is offline, the communications connection to the proposer node is weak, or for other reasons. A voter node may send a proposer-changing request after a period of time without receiving any proposal from the proposer node associated with the current epoch value. A voter node may send a proposer-changing request after a period of time during which the voter node's freshest notarized head has not been updated (referring to the head of the freshest notarized chain) which may due to that the proposer node is offline, there is delay in transmission, or other issues. In either case, this period of time may be referred to as timeout. FIG. 10 depicts an illustrative proposer switching process. After proposer switching, the new proposer node then performs a reconciliation process and the committee with the new proposer node starts notarizing proposals. By performing a reconciliation process, the new proposer node can have the latest blockchain information or retrieve the information that it missed during the communication between the previous proposer node and the voter nodes.

The committee 120 of consensus nodes can be determined by an election scheme. In one embodiment of the election scheme, nodes that want to be committee members (either proposer nodes or voter nodes) submit bid transactions or election bids. Bid transactions are submitted in the form of blockchain transactions, which are similar to cryptocurrency transactions in the memory pool except that the underlying transactions are cryptocurrency amounts that the candidate nodes specified to be put in and locked up in an escrow for a committee term, and that these bid transactions are sent for committee election purposes (as opposed to proposal notarization). Candidate nodes also specify whether hey want to be a proposer node or voter node in the bid transaction. The bid transactions may be prepared in a format or includes information that indicates that they are to be used for election purposes.

A committee term is a period of time in which an elected or selected node will serve as a proposer node or voter node. The period of time is measured by a number of blocks on a blockchain. After the committee term expires, the new selected nodes take over and serve new proposer nodes and voter nodes in the next committee term. For example, each committee term may be configured to last 10,800 blocks (e.g., after 10,800 are added to the blockchain which is approximately 3 hours if the blockchain system produces a block per second). Bid transactions submitted during the current committee term are used to determine the proposer nodes and voter nodes for the next committee term. The blockchain system can select candidate nodes with the highest amounts of stake to be the proposer nodes and voter nodes for the next committee term (e.g., top 2 proposer candidate nodes to be proposer nodes and top 3 voter candidate nodes to be voter nodes). The blockchain system can be configured to choose a number of highest stake nodes for proposer nodes and voter nodes. The blockchain system can be configured to pre-select the initial committee (without using an election scheme) and select the subsequent committees by the election scheme discussed above. The blockchain system can select the entire committee 120 for the next committee term or some committee members for the next committee term (e.g., only proposer nodes or voter nodes, only one of the proposer nodes, only one of the voter nodes, etc.).

Other election schemes can also be used.

The blockchain system can reconfigure or replace the proposer nodes and voter nodes in the current committee term with the proposer nodes and voter nodes selected for the next committee term when the current committee term expires. The replacement process occurs after the election process is completed. In one embodiment, the blockchain system is configured to execute the replacement process after a number of blocks are finalized (or after every Nth finalized block). For example, the blockchain system can replace the proposer and voter nodes after every 10,800 blocks are finalized. The Nth or the $10,800^{th}$ block in the example may be referred to as a stop block and this replacement technique may be referred to as a stop block technique. After the Nth block is finalized, the blockchain system retires the entire current committee (e.g., converting them into regular consensus nodes such that they are without the ability to propose or vote, or disable or remove their proposing or voting ability) and allows the new committee to take over from the stop block. The new committee will propose and vote on candidate blocks from that point forward until its committee term expires. This technique can replace both proposer nodes and voter nodes.

In another embodiment, the blockchain system is configured to perform the replacement process by having voter odes of the current committee and voter nodes of the next committee vote on the same proposal. The blockchain system may require a threshold number of voter nodes from each committee to vote on the proposal in order to have the replacement to occur. The required number of votes from each committee is preferably ⅔ of the total number of voter nodes in each committee (e.g., ⅔ from the current committee and ⅔ from the next committee) but other numbers are also contemplated. In the replacement process, voter nodes that not connected over a communications network are allowed to be connected and communicate over the communications network. This embodiment may require the voter nodes that are voting to be online and connected. This technique can replace voter nodes and the proposer nodes stay and are reused. This replacement process may also be based on the vote-by-stake scheme.

Other reconfiguration or replacement techniques are also contemplated.

The blockchain system can be configured to switch proposer within each committee term in another manner, in addition to having the voter nodes advancing their epoch value. In one embodiment, the number of candidate blocks each proposer in the committee can propose is proportional to the amount of stake it places in its election bid. After that number of candidate blocks are proposed, the blockchain system disallows that proposer from proposing additional candidate blocks and lets another proposer to take over and propose candidate blocks. For example, if proposer P1 puts 40 bitcoins in the escrow and the other proposer P2 puts 10 bitcoins in the escrow, then proposer P1 gets to propose 80% of the total number of candidate blocks available in the committee term and the proposer P2 gets to propose 20% of that total number. The order in which proposers should propose may also be proportional to the amount of stake it places in the escrow (e.g., the proposer with the larger stake proposing first) or be random. A proposer can determine which transactions to be included or excluded from a proposal (e.g., from the memory pool, the proposer may select only transactions from certain nodes or addresses or ignore transactions from certain nodes or addresses), and thus gets to determine which transactions to be recorded or not recorded on the blockchain. By switching proposer in this manner, the blockchain system reduces the chance of transactions being censored (e.g., being unselected) for a full committee term. This method may be referred as forced proposer switching because the proposer must be changed after proposing or notarizing a number of candidate blocks.

Embodiments of the present invention provide high throughput and low finality time. Traditional consensus systems and protocols can process approximately 10-20 transactions per second and finalize transactions in approximately 60-90 seconds (e.g., Ethereum produces one block every 10-15 seconds and needs to wait for an additional 6 blocks to be considered secured or finalized), whereas consensus systems and protocols of the present invention can process approximately 1000 transactions per second and finalize transactions in approximately 1-5 seconds. Some conventional consensus systems and protocols do not even define the concept of finality. This performance has been achieved consistently when there is less than ⅓ of Byzantine voter nodes and there is a network partition (e.g., committee of consensus nodes) which has at least one honest proposer and ⅔ honest voter nodes. This performance also has been achieved consistently in other conditions. Consensus systems and protocols of the present invention also provide a simple method to rapidly switch the proposer node. The present invention also works in the practical synchronous network and scalability of voter nodes is linear.

A block refers to a block on a blockchain or a block to be added onto a blockchain so that it extends from the latest block from blockchain. A block may include transactions, hash of the previous electronic block, hash of the current electronic block, a timestamp, Merkle root, target, nonce, and other information, or one or more of the aforementioned information. FIG. 6 depicts an illustrative block and it may include other data fields indicated above.

Signature or its equivalents from proposer node's perspective refers to a digital signature created by the proposer node proving that the proposer node is the creator or proposer of the candidate block. The digital signature is unique to each proposer node. For example, a digital signature be created by hashing the transactions to obtain a hash value and encrypting the obtained hash value using a private key. The encrypted hash value is the digital signature. The digital signature and a public key corresponding to the private key are transmitted with the candidate block to a voter node.

After the voter node receives the candidate block, digital signature, and public key, the voter node decrypts the digital signature using the public key. The voter node is aware of the transactions that it is expecting from this block and hashes the transactions it is expecting using the same hash algorithms employed by the proposer node. If the hash value from the decryption of the digital signature and the hash value from the voter node are the same, then the voter node knows that the transactions have not been altered in transit and verifies that the proposer node is the creator, proposer, or transmitter.

Validation or its equivalent refers to that the voter node knows that the transactions have not been altered in transit and/or verifies that the proposer node is the creator, proposer, or transmitter. Validation or its equivalent may also refer to determining that the signature on the candidate block comes from the correct proposer node or the proposer node in that session (determined by the local epoch value) and/or the transaction data is correct. A combination of verifying that the proposal comes from the correct proposer node and that the transactions data in the proposal are correct is also contemplated.

After verifying or validating proposal, the voter node applies its digital signature to the proposal (signs the proposal and votes the proposal are other synonymous languages). The concept of signature described above also similarly applies to the voter node.

Other signature and validation methods are also contemplated. Signature and validation methods can be based on processes known in the art.

A proposer node may also be referred as a leader node, and a committee node may refer to either a proposer node or a voter node. The committee of nodes, proposer nodes, and voter nodes are implemented with algorithms to perform their respective functions. The blockchain system and the blockchain consensus software application include such algorithms and algorithms for performing the reconciliation process, the notarization process, the election scheme, the freshest notarized chain determination process and other chain determination process), and other processes and schemes described in this application. The initial committee is determined by the blockchain system and blockchain consensus software application, such as from the codes the software developers program into the algorithms (e.g., specific proposer nodes and voter nodes selected by the software developers and the selected nodes are coded into the algorithms). The subsequent committee is selected from an election scheme.

Honesty means that a node is performing what it is required to perform (e.g., executing the preparing, submitting, signing, and transmitting steps), that the transactions and/or sequence number are not manipulated by the node to add incorrect transaction data and/or change sequence number, or a combination thereof.

Being Byzantine means that a node is violating or is attempting to violate one or more of the above honesty requirements.

Transactions or transaction data may be cryptocurrency transactions (e.g., Bitcoin transactions), bank transactions, credit card transactions, and other transactions that involve paper money (e.g., an individual can obtain paper money from a bank). Transactions or transaction data may also be non-currency or non-monetary transactions, transactions used to create and call smart contracts, or other transactions used to perform other tasks. Transactions or transaction data may also be other types of data (e.g., computer instructions) or records (e.g., business records, medical records). Combinations of the aforementioned transactions, data, and records are also contemplated.

Protocols and algorithms described in this application are implemented on computers or node computers that are connected by a communications network. The communications network can include the Internet, a cellular network, a telephone network, a computer network, a packet switching network, a wide area network (WAN), a global area network, or other network. Embodiments of the present invention are directed to systems, devices, and methods that perform the protocols and algorithms. Embodiments of the present invention are also related to a non-transient computer readable medium configured to carry out any one of the methods disclosed herein. The protocols and algorithms can be a set of computer instructions readable by a processor and stored on the non-transient computer readable medium. Such medium may be permanent or semi-permanent memory such as hard drive, floppy drive, optical disk, flash memory, ROM, EPROM, EEPROM, etc., as would be known to those of ordinary skill in the art. Block or blockchain information may be stored on the non-transient computer readable medium or the memory. Memory, for example, may be cache memory, semi-permanent memory such as RAM, and/or one or more types of memory used for temporarily storing data.

Processor may include an application specific integrated circuit (ASIC), programmable logic array (PLA), digital signal processor (DSP), field programmable gate array (FPGA), or any other integrated circuit. Processor can also include one or more of any other applicable processors, such as a system-on-a-chip that combines one or more of a CPU, an application processor, and memory, or a reduced instruction set computing (RISC) processor.

It is understood that the term "must" and the limitations, numbers, conditions, results, or other occurrences that follow or are associated with the term "must" are used to exemplify that the described situations are example of Applicant's technology (e.g., embodiments of one or more inventions) and that Applicant's technology is not limited to those operations and outcomes. A person with ordinary skill in the art would understand that Applicant's technology can be configured to perform and achieve other operations and outcomes. Broader, different, or generic inventions or embodiments of inventions are contemplated while at the same time specific embodiments are also contemplated based on the use of the term "must." The same clarification also applies to other similar terms such as "strictly fresher" and other phrases.

It is also understood that the numbers, fractions, percentages, or other requirements (e.g., 1/3, 2n/3, 4n/3, etc.) mentioned in this disclosure may be part of an inventive concept and can also be provided for illustrative purposes of broader, different, or generic aspects. Numbers, fractions, and percentages other than those specified (larger or smaller) are also contemplated.

It will readily be understood by one having ordinary skill in the relevant art that the present invention has broad utility and application. Other embodiments may be discussed for additional illustrative purposes in providing a full and enabling disclosure of the present invention. Moreover many embodiments such as adaptations, variations, modifications, and equivalent arrangements will be implicitly disclosed by the embodiments described herein and fall within the scope of the present invention.

Accordingly, while the embodiments of the present invention are described herein in detail in relation to one or more embodiments, it is to be understood that this disclosure is illustrative and exemplary of the present invention and is made merely for the purposes of providing a full and enabling disclosure of the present invention. The detailed disclosure herein of one or more embodiments is not intended nor is to be construed to limit the scope of patent protection afforded by the present invention, which scope is to be defined by the claims.

Thus for example any sequence(s) and/or temporal order of steps of various processes or methods (or sequence of system connections or operation that are described herein are illustrative and should not be interpreted as being restrictive. Accordingly, it should be understood that although steps of various processes or methods (or connections or sequence of operations) may be shown and described as being in a sequence or temporal order, but they are not necessarily limited to being carried out in any particular sequence or order. Other sequences or temporal order is contemplated and would be understood to exist by those of ordinary skill in the art. In addition systems or features described herein are understood to include variations in which features are removed, reordered, or combined in a different way.

Additionally it is important to note that each term used herein refers to that which the ordinary artisan would understand such term to mean based on the contextual use of such term herein. It would be understood that terms that have component modifiers are intended to communicate the modifier as a qualifier characterizing the element, step, system, or component under discussion.

The words "may" and "can" are used in the present description to indicate that this is one embodiment but the description should not be understood to be the only embodiment.

Although the present invention has been described and illustrated herein with referred to preferred embodiments, it will be apparent to those of ordinary skill in the art that other embodiments may perform similar functions and/or achieve like results. Thus it should be understood that various features and aspects of the disclosed embodiments can be combined with or substituted for one another in order to form varying modes of the disclosed invention.

The invention claimed is:

1. A system comprising:
a plurality of node computers, each node computer in the plurality including a processor, memory storing computer instructions executable by the processor, and a network interface operatively coupled to the processor and a communications network connecting the plurality of node computers, wherein the plurality of node computers are configured to create a blockchain containing transactions that is maintained by the plurality of node computers, the plurality of node computers includes a committee of node computers comprising proposer node computers and voter node computers;
wherein the system is configured to provide a sequence number to a proposal or a block on the blockchain;
wherein the committee is configured to perform a notarization process, and in the notarization process, a proposer node computer in the committee is configured to prepare and send multiple unnotarized proposals, each including transactions, to the voter node computers in the committee; each of the voter node computers in the committee is configured to sign a unnotarized proposal when the voter node computer has the same record of the blockchain as the proposer node computer and to send the signed proposal to the proposer node computer; and the proposer node computer is configured to notarize a unnotarized proposal after the proposer node computer receiving a threshold number of signatures for the unnotarized proposal, wherein a notarized proposal is a block added to the blockchain;
wherein the proposer node computer is further configured to send the multiple unnotarized proposals to the voter node computers before the proposer node computer notarizes any proposal or receives any signature from the voter node computers;
wherein the proposer node computer is further configured to send another unnotarized proposal after sending the multiple unnotarized proposals to the voter node computers after the proposer node computer notarizes a unnotarized proposal in the multiple unnotarized proposals;
wherein the same record is a notarized chain whose last block has largest sequence number provided by the system; and
wherein the system is configured to determine a finalized chain from the notarized chain without a number of last blocks in the notarized chain, wherein the number of last blocks corresponds to the number of multiple unnotarized proposals sent by the proposer node computer and the finalized chain consists of blocks that are irreversible by node computers in the system.

2. The system according to claim 1, wherein the sequence number of the block with the largest sequence number in the proposer node computer and the sequence number of the block with the largest sequence number in the voter node computer match.

3. The system according to claim 1, wherein the sequence number of the block with the largest sequence number in the proposer node computer is at least the same as or greater than the sequence number of the block with the largest sequence number in the voter node computer.

4. The system according to claim 1, wherein the committee is further configured to perform a reconciliation process, and in the reconciliation process, a proposer node computer in the committee is configured to send a status request to the voter node computers in the committee requesting each voter node computer to provide blockchain information on each voter node computer, and each voter node computer is configured to send its blockchain information to the proposer node computer.

5. The system according to claim 4, wherein further in the reconciliation process, the one proposer node computer is configured to send a data request to one of the voter node computers when the blockchain information the one proposer node computer has on the one voter node computer and the blockchain information on the one voter node computer are different after the proposer node computer receives the blockchain information on the one voter node computer.

6. The system according to claim 5, wherein further in the reconciliation process, the one voter node computer is configure to provide missing blockchain information to the one proposer node computer so that the blockchain information the one proposer node computer has on the one voter node computer and the blockchain information on the one voter node computer match after the data request.

7. The system according to claim 4, wherein the system is configured to perform the reconciliation process before any notarization process is performed.

8. The system according to claim 1, wherein the threshold number of signatures is at least ⅔ of the total number of voter nodes in the committee.

9. The system according to claim 1, wherein the threshold number of signatures is equivalent to a number of voter notes that together holds at least ⅔ of the total stake in the committee.

10. The system according to claim 1, wherein the sequence number includes a first value indicating which committee is preforming a notarization process, a second value indicating which proposer in the committee is proposing proposals, and a third value indicating a block identification number.

11. The system according to claim 1, wherein the voter node computers are configured send a proposer-change request to another proposer computer node in the committee after a period of time without receiving a proposal from the proposer node computer.

12. The system according to claim 11, wherein the other proposer computer is configured to receive proposer-change requests and notarize the proposer-change requests after receiving a threshold number of proposer-change requests.

13. The system according to claim 11, wherein the other proposer computer is configured to instruct the voter node computers to advance their epoch value.

14. The system according to claim 13, wherein the voter node computers are configured to receive proposals from the other proposer computer after their epoch value advances.

15. The system according to claim 1, wherein the proposer computer nodes and the voter node computers are selected from a group of candidate nodes based a bid transaction they submitted.

16. The system according to claim 15, wherein each candidate node submits a bid transaction specifying an amount of stake to be put in an escrow and indicating whether it wants to be a proposer node computer or a voter node computer, and the system selects a number of candidate nodes with highest stakes to be proposer node computers and voter node computers.

17. The system according to claim 1, wherein the system is configured to select a new committee including proposer node computers and voter node computers pursuant to an election scheme.

18. The system according to claim 17, wherein the system is configured to replace the committee with the new committee by having a threshold number of voter node computers in the committee and a threshold number of voter node computers in the new committee signing a proposal or after a number of blocks.

19. A computer-implemented method comprising:
implementing a blockchain consensus software application in a plurality of node computers, each node computer in the plurality including a processor, memory storing computer instructions executable by the processor, and a network interface operatively coupled to the processor and a communications network connecting the plurality of node computers, the application configuring the plurality of node computers to create a blockchain containing transactions that is maintained by the plurality of node computers and to form a committee of node computers comprising proposer node computers and voter node computers;
wherein the blockchain consensus software application includes computer instructions stored in the memory that are executable by the processor to perform computer-implemented steps comprising:
providing a sequence number to a proposal or a block on the blockchain;
performing a notarization process comprising configuring a proposer node computer in the committee to prepare and send multiple unnotarized proposals, each including transactions, to the voter node computer; configuring each of the voter nodes in the committee to sign an unnotarized proposal when the voter node computer has the same record of the block chain as the proposer node computer and to send the signed proposal to the propose node computer; and configuring the proposer node computer to notarize a unnotarized proposal after the proposer node computer receiving a threshold number of signatures for the unnotarized proposal, wherein a notarized proposal is a block added to the blockchain;
sending, by the proposer node computer, the multiple unnotarized proposals to the voter node computers before the proposer node computer notarizing any proposal or receiving any signature from the voter node computers;
sending, by the proposer node computer, another unnotarized after sending the multiple unnotarized proposals proposal to the voter node computers after the proposer node computer notarizing a unnotarized proposal in the multiple unnotarized proposals;

wherein the same record is a notarized chain whose last block has largest sequence number provided by the application; and wherein the computer-implemented steps further comprising determining a finalized chain from the notarized chain without a number of last blocks in the notarized chain, wherein the number of last blocks corresponds to the number of multiple unnotarized proposals sent by the proposer node computer and the finalized chain consists of blocks that are irreversible by node computers in the plurality.

20. A non-transitory computer readable medium storing an application cause a computer to execute a process, the process comprising:

implementing a blockchain consensus software application in a plurality of node computers, each node computer in the plurality including a processor, memory storing computer instructions executable by the processor, and a network interface operatively coupled to the processor and a communications network connecting the plurality of node computers, the application configuring the plurality of node computers to create a blockchain containing transactions that is maintained by the plurality of node computers and to form a committee of node computers comprising proposer node computers and voter node computers;

wherein the blockchain consensus software application includes computer instructions stored in the memory that are executable by the processor to perform computer-implemented steps comprising:

providing a sequence number to a proposal or a block on the blockchain;

performing a notarization process comprising configuring a proposer node computer in the committee to prepare and send multiple unnotarized proposals, each including transactions, to the voter node computer; configuring each of the voter nodes in the committee to sign an unnotarized proposal when the voter node computer has the same record of the block chain as the proposer node computer and to send the signed proposal to the propose node computer; and configuring the proposer node computer to notarize a unnotarized proposal after the proposer node computer receiving a threshold number of signatures for the unnotarized proposal, wherein a notarized proposal is a block added to the blockchain;

sending, by the proposer node computer, the multiple unnotarized proposals to the voter node computers before the proposer node computer notarizing any proposal or receiving any signature from the voter node computers;

sending, by the proposer node computer, another unnotarized after sending the multiple unnotarized proposals proposal to the voter node computers after the proposer node computer notarizing a unnotarized proposal in the multiple unnotarized proposals;

wherein the same record is a notarized chain whose last block has largest sequence number provided by the application; and wherein the computer-implemented steps further comprising determining a finalized chain from the notarized chain without a number of last blocks in the notarized chain, wherein the number of last blocks corresponds to the number of multiple unnotarized proposals sent by the proposer node computer and the finalized chain consists of blocks that are irreversible by node computers in the plurality.

* * * * *